United States Patent [19]

Nguyen et al.

[11] Patent Number: 5,502,821

[45] Date of Patent: Mar. 26, 1996

[54] METHOD OF DETERMINING DEVICES REQUESTING THE TRANSFER OF DATA SIGNALS ON A BUS

[75] Inventors: Uoc H. Nguyen, Long Beach; Sam S. Su, Rowland Hts.; Li-Fung Cheung, Alhambra, all of Calif.

[73] Assignee: Xerox Corporation, Stamford, Conn.

[21] Appl. No.: 909,511

[22] Filed: Jun. 29, 1992

[51] Int. Cl.$^6$ ............................................. G06F 13/00
[52] U.S. Cl. .......................... 395/280; 364/DIG. 1; 364/ 229; 364/240; 364/240.5; 364/240.9; 364/242.3
[58] Field of Search ................................. 395/325, 280

[56] References Cited

U.S. PATENT DOCUMENTS

| | | | |
|---|---|---|---|
| 4,442,504 | 4/1984 | Dummermuth et al. | 395/725 |
| 4,630,195 | 12/1986 | Hester et al. | 395/375 |
| 4,688,168 | 8/1987 | Gudaitis et al. | 395/325 |
| 4,811,278 | 3/1989 | Bear et al. | 395/425 |
| 5,081,701 | 1/1992 | Silver | 395/325 |
| 5,083,269 | 1/1992 | Syobatake | 395/425 |
| 5,089,953 | 2/1992 | Ludicky | 395/425 |

OTHER PUBLICATIONS

Andrews, Warren, "Mezzainine Buses Struggle with Standards," Computer Design, Jul., 1991, pp. 81–82, 84, 86–88.

*Primary Examiner*—Jack B. Harvey
*Assistant Examiner*—Ayaz R. Sheikh
*Attorney, Agent, or Firm*—Robert Cunha

[57] ABSTRACT

A method is described for determining readiness of devices in a digital data bus system to transfer data signals. The bus system includes a bus having a clock line for communicating a clock signal, address lines for communicating address signals, data lines for communicating data signals, and control lines for communicating control signals. The bus system also includes a plurality of devices. Each device is connected to the bus and has an address on the bus. At least one device is a source device capable of sending data signals and at least one device is a destination device capable of receiving data signals. A bus controller connects to the bus and controls the bus. The control lines include bus request lines that connect each device to the bus controller for communicating a bus request signal from a device to the bus controller. The bus request signal indicates that the device is ready to send or receive data signals. The bus controller includes matching logic that stores the identities of predetermined pairs of a source device and a destination device between which matching logic will permit the transfer of data signals. The matching logic receives the bus request signals and determines based on the bus request signals whether a particular allowed pair of source and destination devices are ready to send and receive data signals. According to the method, a source device generates a bus request signal on the bus request lines indicating whether the source device is ready to send data signals on the data lines. Next, a destination device generates a bus request signal on the bus request lines indicating whether the destination device is ready to receive data signals on the data lines. Finally, the matching logic receives the bus request signal generated by the source device and the bus request signal generated by the destination device and, provided the pair of destination and source device are a pair allowed to transfer data signals, decides based on the received bus request signals whether the pair of the destination and source devices is ready to send and receive data signals.

1 Claim, 7 Drawing Sheets

METHOD OF DETERMINING DEVICES REQUESTING THE TRANSFER OF DATA SIGNALS ON A BUS

This invention relates to a method for determining devices requesting the transfer of data signals on a bus, and in particular to a method for transferring data signals on the bus only when both the source and destination devices are prepared for a data signal transfer.

BACKGROUND

A common arrangement for low end microcomputer systems places system elements, such as the central processing unit (CPU), main memory (e.g., random access memory, or RAM), read only memory (ROM) and Input/Output (I/O) devices, on the same main bus. Communication on the main bus is through the CPU, an arrangement that can result in unacceptably slow transfer of data (e.g., from an I/O device to RAM). Moreover, devices on the main bus with lower priority, such as I/O devices, face long waits to transfer data.

In response to these shortcomings, Direct Memory Access (DMA) controllers were developed. A DMA controller connects to the main bus, and is responsible for controlling data signal transfers on the main bus between RAM and I/O devices. To make data signal transfers, a DMA controller takes control of the main bus when the CPU is not using it (i.e., cycle stealing). Although DMA controllers generally perform adequately, DMA controllers suffer from certain limitations. With a DMA controller, the rate of data transfer is limited by how frequently the CPU allows the DMA controller to gain control of the main bus, and how long the DMA controller can keep control of the main bus. Moreover, DMA controllers are not designed to facilitate data signal transfers between I/O devices: Typically a DMA controller transfers data signals to or from a particular (i.e., addressed) memory location in RAM one word at a time. Moreover, the DMA controller typically assumes the RAM will be available to receive a word. This is a safe assumption for most RAMs, which have relatively quick access times, but may not be a safe assumption for an I/O device.

Another response to the shortcomings of using only the main bus was the mezzanine bus. A mezzanine bus is a second or auxiliary bus that is parallel to the main bus, and also is connected to the main bus through a bus to bus interface. The mezzanine bus connects most, if not all, of the I/O devices that would otherwise connect directly to the main bus. In this manner, the I/O devices on the mezzanine bus can transfer data signals between each other without the need to communicate over the main bus. The mezzanine bus includes a bus controller, and may even include a DMA controller. Although mezzanine busses have generally proven adequate, particularly when combined with DMA controllers, there remains inadequacies in transferring data signals between I/O devices. In addition to the inadequacies of the DMA controllers, discussed above, typically the mezzanine bus approach fails to take into account the unique nature of I/O device to I/O device transfers, in which although it is not known in advance when I/O devices will need to transfer data signals to other I/O devices, it is often known in advance what I/O devices need to communicate with each other.

SUMMARY OF THE INVENTION

A method is described for determining readiness of devices in a digital data bus system to transfer data signals. The bus system includes a bus having a clock line for communicating a clock signal, address lines for communicating address signals, data lines for communicating data signals, and control lines for communicating control signals. The bus system also includes a plurality of devices. Each device is connected to the bus and has an identification or address on the bus. At least one device is a source device capable of sending data signals and at least one device is a destination device capable of receiving data signals. A bus controller connects to the bus and controls the bus. The control lines include bus request lines that connect each device to the bus controller for communicating a bus request signal from a device to the bus controller. The bus request signal indicates that the device is ready to send or receive data signals. The bus controller includes matching logic that stores the identities of predetermined pairs of a source device and a destination device between which matching logic will permit the transfer of data signals. The matching logic receives the bus request signals and determines based on the bus request signals whether a particular allowed pair of source and destination devices are ready to send and receive data signals. According to the method, a source device generates a bus request signal on the bus request lines indicating whether the source device is ready to send data signals on the data lines. Next, a destination device generates a bus request signal on the bus request lines indicating whether the destination device is ready to receive data signals on the data lines. Finally, the matching logic receives the bus request signal generated by the source device and the bus request signal generated by the destination device and, provided the pair of destination and source device are a pair allowed to transfer data signals, decides based on the received bus request signals whether the pair of the destination and source devices is ready to send and receive data signals.

DESCRIPTION OF THE PREFERRED EMBODIMENT

System Elements

Figure 1:
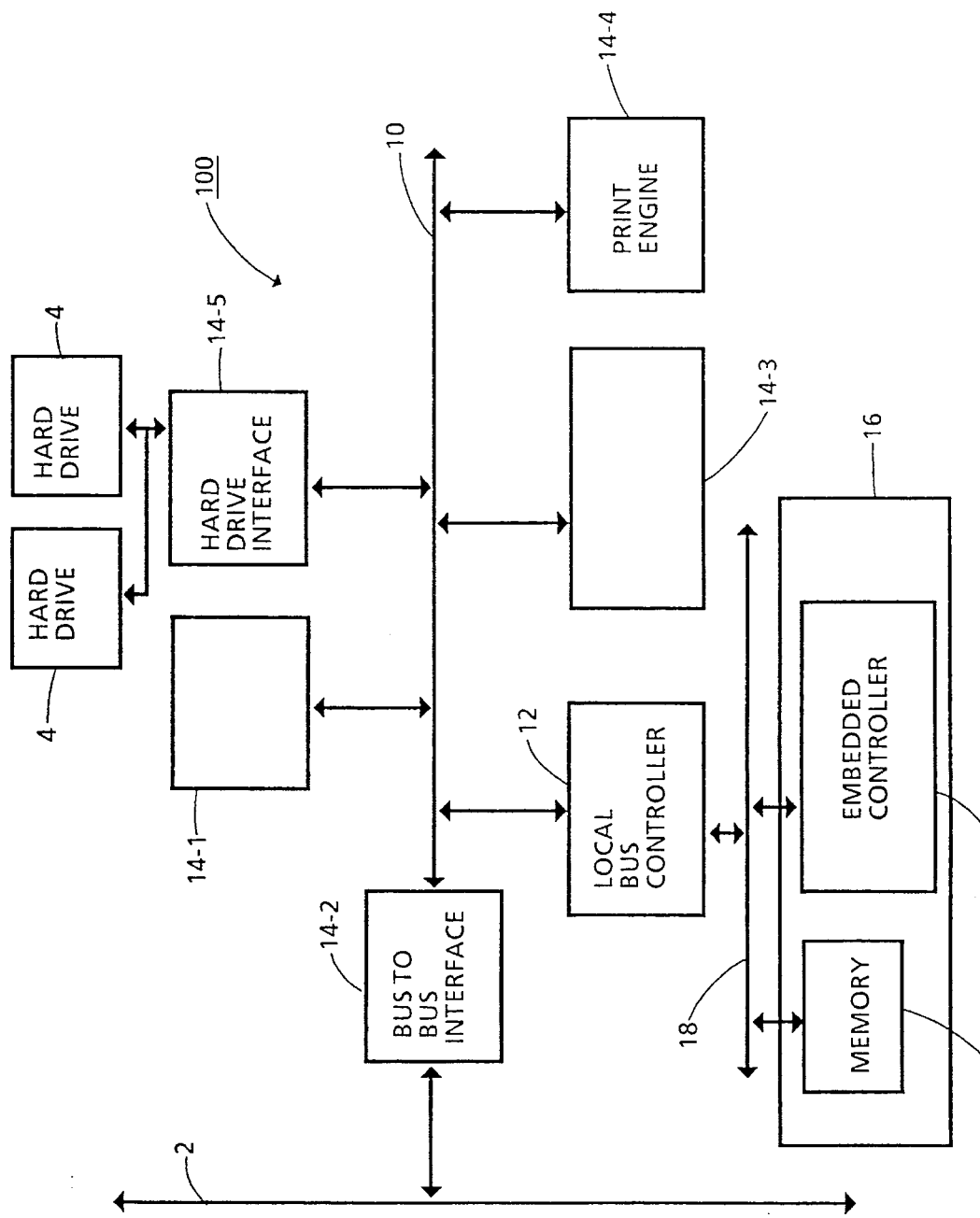
FIG. 1 is a system block diagram of a bus system, embodying the method of the present invention, that includes a local bus, local bus controller, and devices connected to the local bus.

Referring now to FIG. 1, there is shown a system block diagram of the control subsystem 100 that controls a laser printer (not shown). Control subsystem 100 includes a microcomputer 16 having an embedded controller 20 and memory 22 (i.e., ROM and RAM) connected by means of main bus 18. Preferably embedded controller 20 is an AMD 29200, a 32 bit machine. Control subsystem 100 further includes local bus 10, which is controlled by bus controller 12, and five devices 14 that are connected to local bus 10. Devices 14 include specialized hardware designed to perform some of the image processing tasks associated with printing, such as device 14-1 and device 14-3. Devices 14 also include device 14-4 for interfacing with a xerographic print engine (not shown), device 14-5 for connecting local bus 10 to hard drives 4, and device 14-2 for connecting local bus to to local area network (LAN) 2. Local bus 10 operates in parallel with main bus 18, and off-loads from main bus 18 the data signal transfers between devices 14. Local bus 10 connects to main bus 18 through bus controller 12.

In brief, referring now to FIGS. 1,2, 3 and 4, local bus 10 is a high speed synchronous, parallel, digital data bus capable of exchanging data signals 25 among devices 14, and between devices 14 and bus controller 12. Local bus 10 includes a clock line 23 for communicating a high speed clock signal 61, data lines 24 for communicating data signals 25, address lines 26 for communicating address signals 27, and control lines 28 for communicating control signals, such as bus grant control signal 63. Clock signal 61 preferably has a frequency of 20 MHz or greater, to allow for high speed transfer of data signals 25.

Local Bus

Address lines 26 communicate address signals 27 from bus controller 12 to devices 14 for two distinct purposes. Bus controller 12 uses address lines 26 in conjunction with data lines 24 and certain of control lines 28 to program a particular device 14, such as device 14-1, with one or more addresses on local bus 10. Once device 14-1 has been programmed with an address, bus controller 12 can use address lines 26 to actually address device 14-1. The programming of device addresses is described in greater detail in a copending patent application to some of the same inventors, entitled, "Method of Addressing Devices and Transferring Data Signals on a Bus," hereby incorporated by reference.

Preferably each device 14 can both send and receive data signals 25. Each device 14 has a separate, programmable address for sending data signals 25, known as the source address 37. Each device 14 also has a separate, programmable address for receiving data signals 25, known as the destination address 33. A particular device 14 may have a plurality of source addresses 37, destination addresses 33, or both a plurality of source addresses 37 and destination adresses 33.

Address lines 26 consist of ten parallel lines. With ten parallel lines, address lines 26 are capable of addressing $2^{10}$, or 1024 separate addresses. Of course, not all addresses need be used (e.g., FIG. 1 shows only five devices 14, for a total use of ten addresses 33 and 37), and the number of available addresses 33 and 37 can be varied by increasing or decreasing the number of address lines 26.

Preferably, address signals 27 for source addresses 37 are all conveyed by the lower half 26-1 of address lines 26 (i.e., the five least significant bits), and address signals 27 for destination addresses 33 are all conveyed by the upper half 26-2 of address lines 26 (i.e., the five most significant bits). This addressing scheme reduces the number of available addresses to thirty-two (i.e., $2^5$) destination addresses 33 and thirty-two source addresses 37, but also simplifies the address encoding and decoding hardware, as discussed further below.

Preferably there are thirty-two parallel data lines 24, an arrangement that allows data signals 25 to be communicated as thirty-two bit words 55. Of course, a fewer or greater number of data lines 24 could be used (e.g., eight data lines 24 or sixty-four data lines 24 to allow eight bit and sixty-four bit data words 55, respectively). A thirty-two bit word size is chosen to match the word size of the microcomputer 16 and main bus 18, an arrangement that facilitates data transfer between bus 18 and local bus 10.

Figure 4:
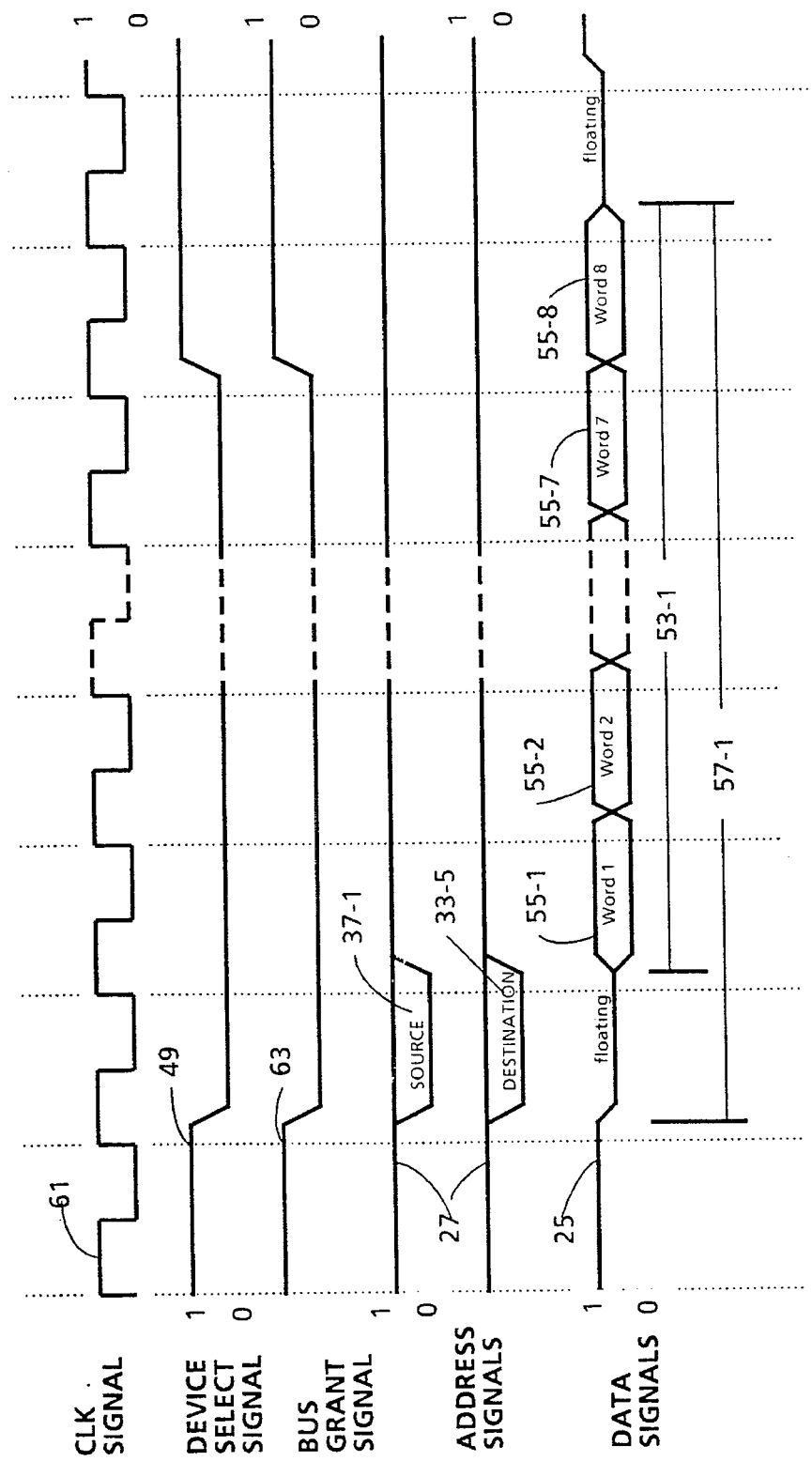
FIG. 4 is a timing diagram depicting the timing of data signals, representing a single communication request, sent from a source device to a destination device under control of the bus grant signal.
Figure 5:
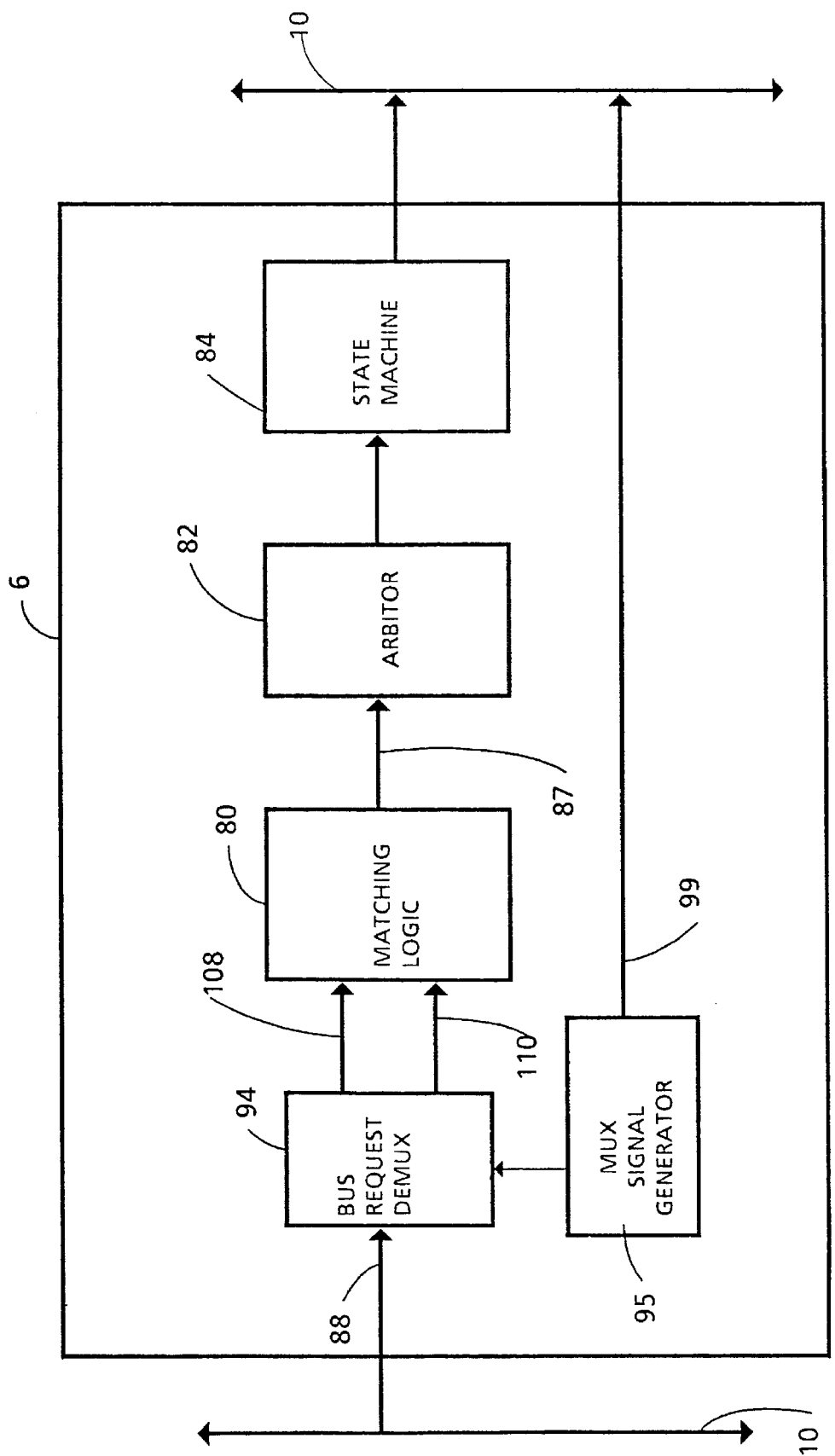
FIG. 5 is a block diagram detailing the structure of the Control Logic of the Local Bus Controller of FIG. 3, including the Matching Logic.

Referring now to FIGS. 1 and 4, data signals 25 are sent over data lines 24 in blocks or groups 53 having a fixed number of thirty-two bit words 55. Fixing the size of a block 53 reduces the overhead required to transfer the block 53. Of course, a fixed block size sometimes requires dummy words 55 to be inserted in the block 53 so the words 55 in a partially full source buffer 36 could still be sent as a full block 53. In FIG. 5 two data transfers 57 are shown. Preferably each data transfer 57 involves sending blocks 53 of eight words 55. Of course, the size of blocks 53 could be set at a number greater or fewer than eight.

Devices

Figure 2:
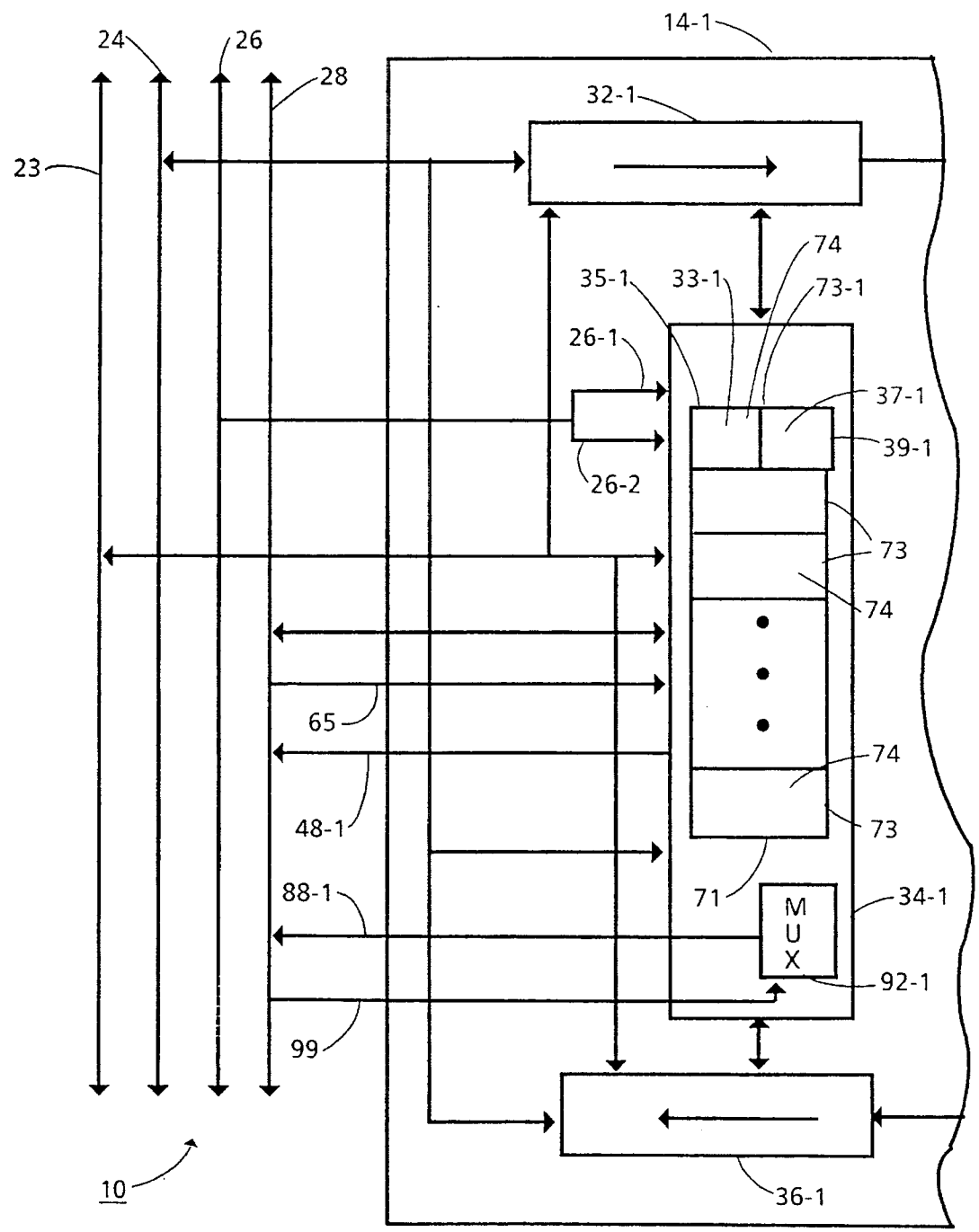
FIG. 2 is a block diagram of one of the devices shown in FIG. 1.

Referring now to FIGS. 1, 2, and 4, each device 14 includes a destination buffer 32, connected to data lines 24, for storing data signals 25 sent on data lines 24 and addressed on address lines 26-1 to the destination address 33 of the device 14. Destination buffer 32 preferably consists of a thirty-two bit by eight bit FIFO (First In, First Out register), a size that allows buffer 32 to store one entire block 53 of eight thirty-two bit data words 55. Of course, buffer 32 could be made deeper so that buffer 32 could store the data words 55 of multiple blocks 53.

Destination buffer 32 is controlled by device controller 34. Device controller 34 includes a destination address register 35 that contains the destination identification or address 33 of the device 14. The particular destination address 33 in destination address register 35 can be programmed by bus controller 12.

Each device 14 also includes a source buffer 36, connected to data lines 24, for storing data signals that the device 14 desires to be sent on to local bus 10 from the source address 37 of the device 14. Similar to destination buffer 32, source buffer 36 consists of a thirty-two bit wide by eight bit deep FIFO, and is controlled by device controller 34. Device controller 34 includes a source address register 39 that contains the source intentification or address 37 of the device 14. The particular source address 37 in source address register 39 can be programmed by bus controller 12.

FIFOs are preferred for buffers 32 and 36 because they allow rapid input and output of blocks 53 of words 55. Moreover, using FIFOs for buffers 32 and 36 allow devices 14 to operate asynchronously from local bus 10. The internal clock rate of device 14 can thus differ from the rate of clock signal 61 of local bus 10.

Local Bus Controller

Figure 3:
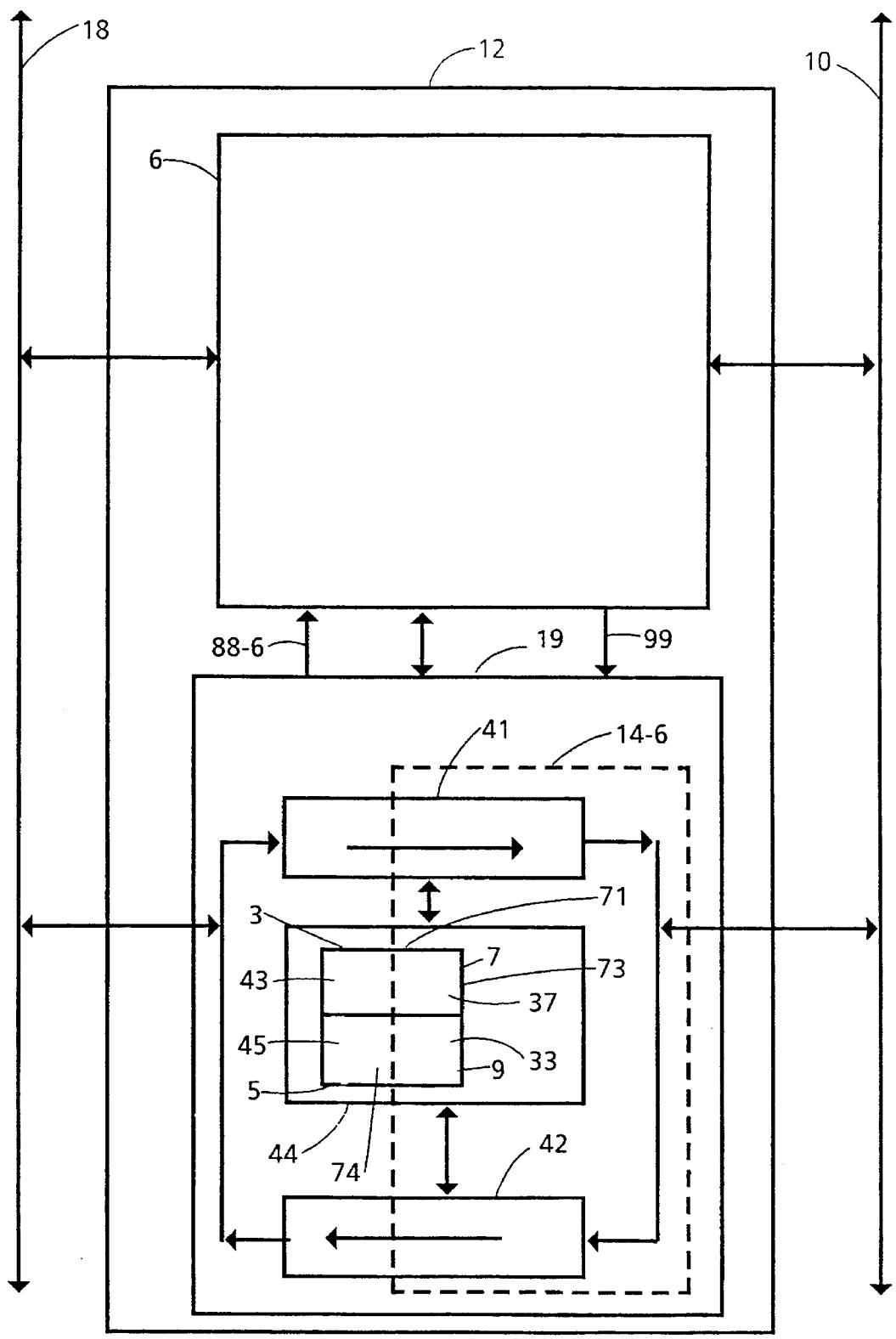
FIG. 3 is a block diagram of the Local Bus Controller shown in FIG. 1.

Referring now to FIGS. 1 and 3, bus controller 12 includes control logic 6 and bus interface 19. In brief, bus interface 19 connects main bus 18 and local bus 10. Control logic 6 determines what data transfers 57 are requested on local bus 10, and arbitrates among the requested data transfers 57 to decide when and in what order the data transfers 57 will be granted. Only certain data transfers 57 will even be considered by control logic 6, as discussed further below.

Bus interface 19 includes buffers 41 and 42, and interface controller 44 for controlling bus interface 19. Interface controller 44 includes respective main bus address registers 3 and 5, and respective local bus address registers 7 and 9 for respective buffers 41 and 42. Buffers 41 and 42 are preferably FIFOs, for reasons discussed above. Buffer 41 serves to transfer data signals 25 from main bus 18 to local bus 10. Buffer 41 has a destination address 43 on main bus 18 and a source address 37 on local bus 10. The destination address 43 is stored in main bus address register 3. Preferably destination address 43 is fixed, or at least some default value for address 43 is known to microcomputer 16. Source address 37 is programmable and stored in local bus address register 7. In operation, buffer 41 stores data signals received from bus 18 that are addressed to buffer 41. At the direction of bus controller 12, buffer 41 transfers the data signals 25 received from main bus 18 on to local bus 10.

Buffer 42 serves to transfer data signals 25 from local bus 10 to main bus 18. Buffer 42 has a programmable destination address 33 on local bus 10, and a programmable source address 45 on main bus 18. Destination address 33 is stored in bus address register 9, and source address 45 is stored in main bus address register 5. In operation, interface controller 44 instructs buffer 42 to store the data signals 25 received from local bus 10 that are addressed to the destination address 33 of buffer 42. At the direction of bus controller 12, interface controller 44 instructs buffer 42 to write these data signals 25 onto main bus 18 from a source address 45 on bus 18.

To devices 14 on local bus 10, bus interface 19 appears as just another device 14. That is, data signals 25 of data transfers 57 are sent to and from bus interface 19 on local bus 10 as if bus interface 19 were another device 14. The appearance of bus interface 19 as a device 14 on local bus 10 is signified in FIG. 3 by enclosing portions of bus interface 19 in a dotted rectangle labeled 14-6, in effect creating a virtual device 14-6. Symbolically, device 14-6 includes local bus address registers 7 and 9 of interface controller 44, as well as the ends of buffers 41 and 42 adjacent local bus 10.

For proper operation, devices 14 and bus interface 19 require programming and control from bus controller 12 beyond programming of the destination and source addresses 33 and 37. For example, bus controller 12 should be able to flush or reset respective destination and source buffers 32 and 36 of devices 14. For this additional control and programming, the device controller 34 of each device 14 and the interface controller 44 of bus interface 19 include a bank 71 of command registers 73. Each command register 73 can be programmed with a control word 74 by bus controller 12.

Bus controller 12 uses control words 74 both to configure and to control devices 14 and bus interface 19. Configuring includes programming addresses 33 and 37. Controlling includes ordering a device 14 to initiate a self-test, or ordering the immediate resetting of source buffer 36. For devices 14, preferably address registers 35 and 39 are part of bank 71 of command registers 73, rather than being a separate structure of registers. In particular, destination address register 35 and source address register 39 are in the respective most and least significant halves of a particular command register 73-1. Similarly, destination address 33 and source address 37 are stored in the respective most and least significant halves of the control word 74 in command register 73-1. Similarly, for bus interface 19 preferably address registers 3, 5, 7 and 9 are also part of a bank 71 of control registers 73 contained in interface controller 44. The programming of control words 74 is described in greater detail in a copending patent application to some of the same inventors, entitled, "Method of Addressing Devices and Transferring Data Signals on a Bus," hereby incorporated by reference.

Referring now to FIGS. 1, 2, 3, 4 and 5, control logic 6 of bus controller 12 includes matching logic 80, arbiter 82 and state machine 84. In brief, matching logic 80 is programmed by microcomputer 16 with the possible data transfers 57 that can be allowed by control logic 6.

Devices 14 communicate to matching logic 80 that devices 14 are ready to send or receive data signals 25, as the case may be, by means of bus request signals 90 on bus request lines 88, which are some of control lines 28. Once matching logic 80 determines that a particular pair of source and destination devices 14 is ready for a data transfer 57, matching logic 80 informs arbiter 82 of the readiness of the particular pair by means of pair ready signals 86 on pair ready line 87. Arbiter 82 chooses among any competing ready pairs according to an arbitration method (not shown) that is programmable by microcomputer 16. Several arbitration methods would be well known to one skilled in the art. Once arbiter 82 has chosen a particular pair for the next data transfer 57 on local bus 10, this information is conveyed to state machine 84. State machine 84 actually controls the data transfers 57, preferably as describe in the copending patent application to some of the same inventors, entitled, "Method of Addressing Devices and Transferring Data Signals on a Bus."

Determining Devices Requesting the Transfer of Data Signals

Referring now to FIGS. 1, 2, 3, 4, 5, and 6, control logic 6 of bus controller 12 determines what data transfers 57 are requested on local bus 10 using matching logic 80 in conjunction with bus request lines 88. Bus request lines 88 are some of control lines 28. A unique bus request line 88 connects each device 14 to control logic 6. For device 14-6 in bus interface 19, bus request line 88 is provided internally. Bus request lines 88 each convey a bus request signal 90 that signals to matching logic 80 that the source buffer 36 of that particular device 14 is ready to send data signals 25, or that the destination buffer 32 of that particular device 14 is ready to receive data signals 25, or that both buffers 32 and 36 are ready.

There are a maximum of thirty-two bus request lines 88 needed, one for each of the possible devices 14 that can be attached to local bus 10. However, since device 14-6 is internal to bus controller 12, only a maximum number of thirty-one bus request lines 88 physically need exist external to bus controller 12.

Bus request signal 90 is multiplexed on bus request line 88 so that only a single bus request line 88 is needed to convey information about the readiness of both buffers 32 and 36. To produce bus request signal 90, the control logic 34 of each device 14 includes bus request multiplexer 92. To demultiplex bus request signal 90, control logic 6 includes bus request demultiplexer 94. To clock bus request multiplexer and demultiplexer 92 and 94, control logic 6 further multiplex signal generator 95. Multiplex signal generator 95 generates a multiplex signal 97 that is carried on multiplex line 99, a single control line 28, to the bus request multiplexer 92, and is carried internal to demultiplexer 94.

Figure 6:
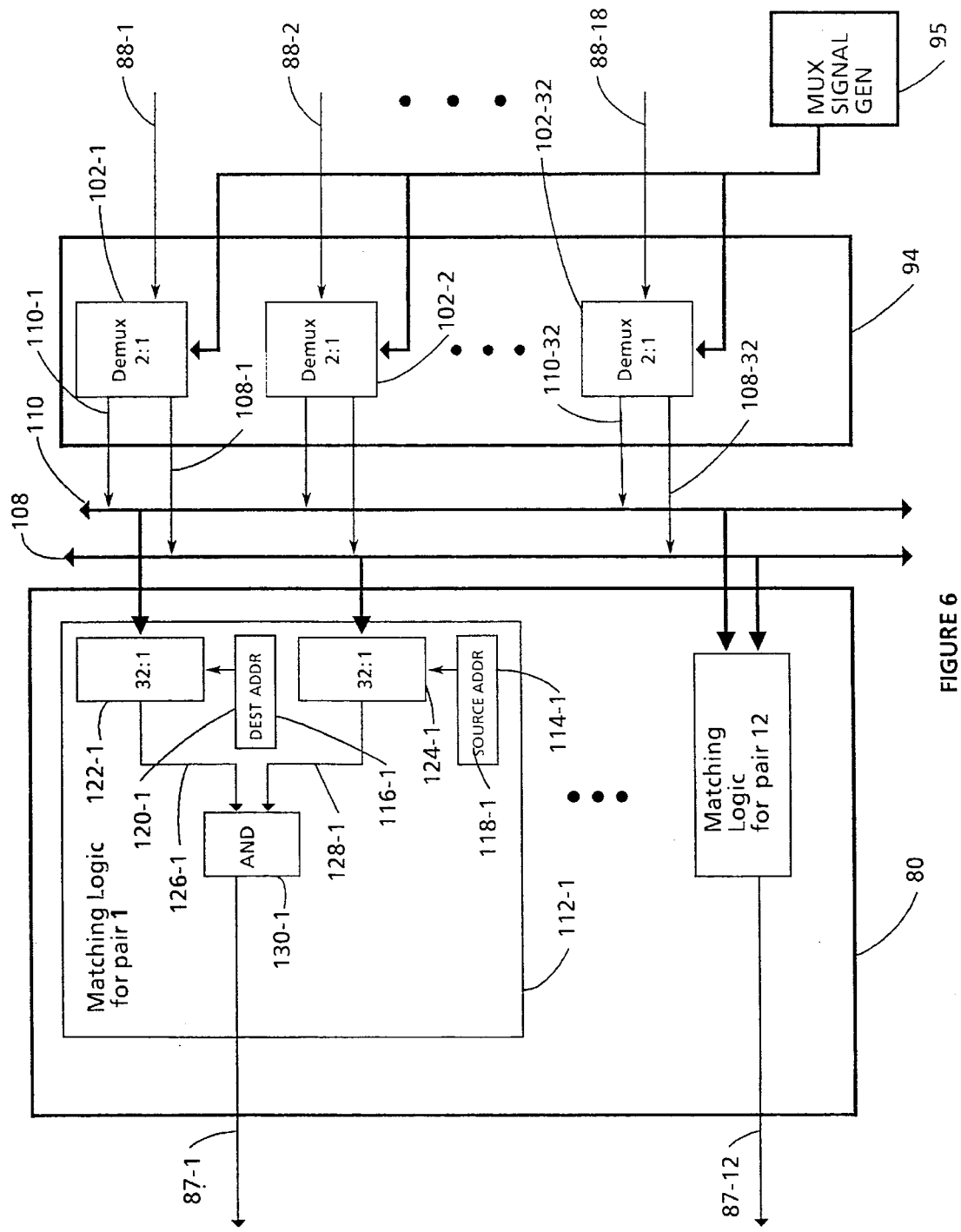
FIG. 6 is a block diagram detailing the structure of the Matching Logic of the Control Logic depicted in FIG. 5.

Referring now to FIG. 6, there is shown a more detailed block diagram of matching logic 80 and bus request demultiplexer 94. Bus request demultiplexer 94 includes thirty two demultiplexers 102. A unique demultiplexer 102 is associated with each bus request line 88. Each demultiplexer 102 is a 2:1 demultiplexer which, under control of multiplex signal 97, demultiplexes its associated bus request signal 90 into a source bus request signal 104 and a destination bus request signal 106. Signals 104 and 106 are conveyed by respective lines 108 and 110 to matching logic 80.

Figure 7:
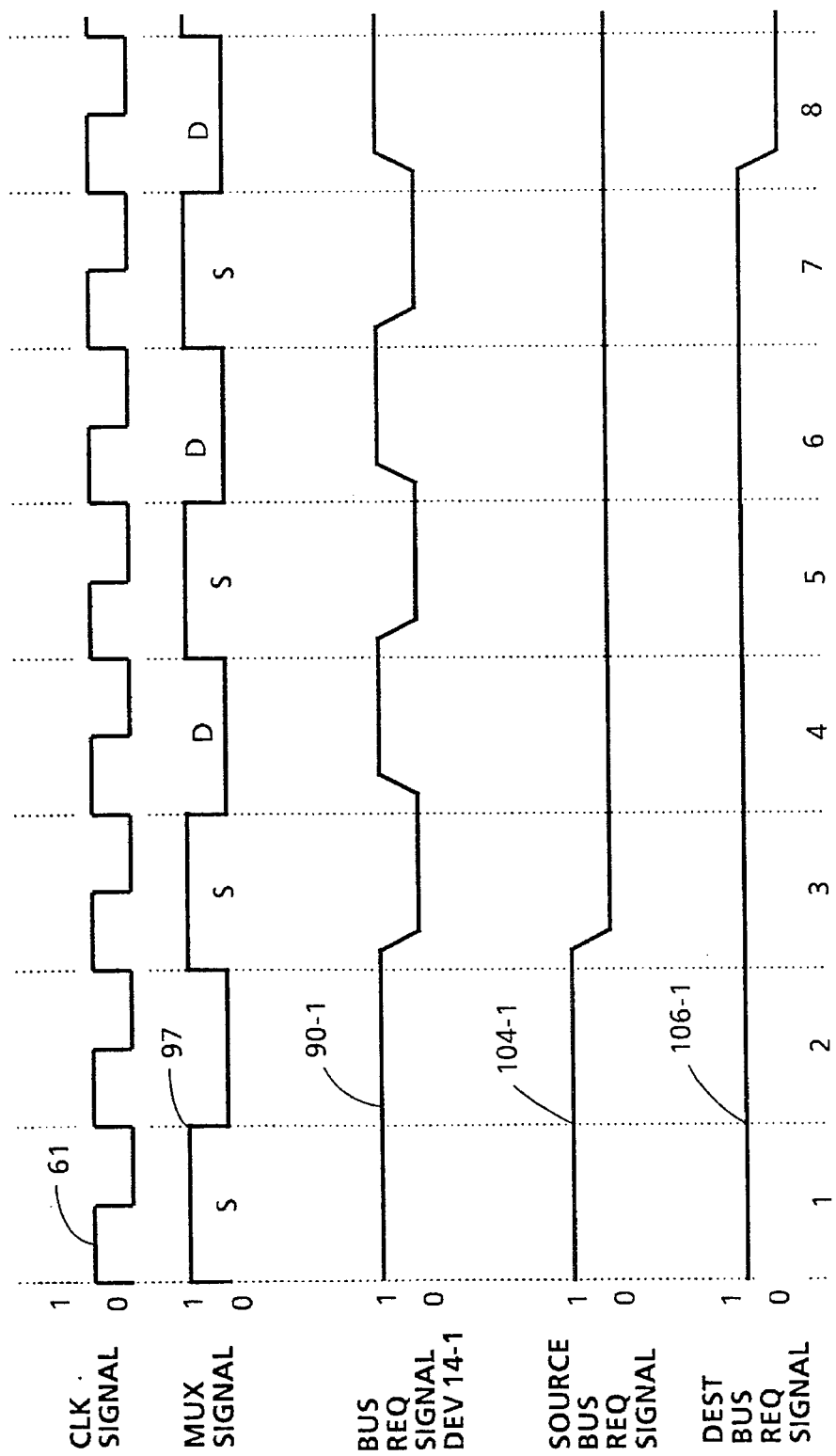
FIG. 7 is a timing diagram depicting the timing of bus request signals.

Referring now to FIG. 7, there is shown the timing relationship between multiplex signal 97, clock signal 61 and the bus request signal 90-1 of device 14-1. There is also shown source and destination buffer signals 104-1 and 106-1 corresponding to bus request signal 90-1 of device 14-1. Multiplex signal 97 is a square wave of one half the frequency of clock signal 61, to provide for rapid update of bus request signals 90. When multiplex signal 97 is a logic 1, each multiplexer 92 conveys as bus request signal 90 the readiness status of the associated source buffer 36. Similarly, when multiplex signal 97 is a logic 0, each multiplexer 92 conveys as bus request signal 90 the readiness status of the associated destination buffer 32. That is, bus request signal 90-1 represents the readiness status of source buffer 36-1 during odd periods of clock signal 61, and represents the readiness status of destination buffer 32-1 during even clock signal 61 periods. A ready status is shown by a logic 1, and a not ready status is shown by a logic 0. Of course, it would be well known to one skilled in the art to use different signals for signals 90 and 97 (e.g. logic 0 for ready instead of logic 1).

For FIG. 7, assume that source buffer 36-1 is ready (i.e., status logic 1) prior to the first period of clock signal 61, but is no longer ready at the start of the third period of clock signal 61, and remains unready for the remainder of the timing diagram. Similarly, assume that destination buffer 32-2 is ready prior to the first period, and remains ready until the start of the seventh period. During the first clock period of clock signal 61, then, bus request signal 90-1 is a logic 1 and source buffer request signal 104-1 is a logic 1. Note that destination buffer request signal is a logic 1, reflecting events prior to the first clock signal 61 period.

In the second period of clock signal 61, multiplex signal 97 is a logic 0, so bus request signals 90 will represent the status of the associated destination buffers 32. In particular, buffer request signal 90-1 is a logic 1, and destination buffer request signal 106-1 is also a logic 1. Source buffer request signal 104-1 remains a logic 1, reflecting the events of the previous period. In the third period, bus request signal 90-1 goes to logic 0, and source buffer request signal 104-1 goes to logic 0 and stays logic 0 for the duration of the timing diagram.

Note that in period seven, destination bus request signal 106-1 remains a logic 1, even though destination buffer 32-1 is no longer ready. Not until the next period will the true state of readiness of destination buffer 32-1 be conveyed to matching logic 80. Most likely, destination buffer 32-1 is no longer ready because state machine 84 has granted a request for a data transfer 57 between destination buffer 32-1 and the source buffer 36 of another device 14 (or even the source buffer 36-1 of device 14), a situation accounted for by arbiter 82 and state machine 84 in their control of data transfers 57.

Referring now to FIG. 6, matching logic 80 includes multiple programmable matching units 112. Each matching unit 112 includes a source address register 114 and a destination address register 116. Microcomputer 16 programs the address registers 114 and 116 of each matching unit 112 with respective source device and destination device addresses 118 and 120. Together, addresses 118 and 120 identify a pair of devices 14 that are allowed by matching logic 80 to transfer data signals 25. The number of matching units 112 determines the number of pairs 86 that matching logic 80 can monitor. For example, in FIG. 6 there is shown twelve matching units 112, for a possible twelve pairs. Of course, the number of matching units 112 could be increased or decreased to change the number of possible pairs.

In each matching unit 112, destination address register 116 and source address register 118 control respective destination and source multiplexers 122 and 124. Destination multiplexer 122 is a 32:1 multiplexer: Multiplexer 122 has as inputs lines 108, of which there are thirty two, and as an output a single line 126. Similarly, source multiplexer 124 is a 32:1 multiplexer having as inputs the thirty two lines 110 and having a single line 128 as an output. In each matching unit 112, output lines 126 and 128 are the inputs to an AND gate 130. The output of AND gate 130 is pair signal 86 on line 87. Of course, pair signal 86 is a logical 1 only if output lines 126 and 128 convey logic 1s.

Lines 108 convey to destination multiplexer 122 the destination bus request signals 106. Lines 110 convey to source multiplexer 124 the source bus request signals 104. In operation, a particular destination multiplexer 122 outputs a logic 1 on its associated output line 126 only if there is a logic 1 destination bus request signal 106 on the input line 108 corresponding to the destination address 120 in the destination address register 116 controlling the particular destination multiplexer 122. Otherwise there is a logic 0 on output line 126. Similarly, a particular source multiplexer 124 outputs a logic 1 on its associated output line 128 only if there is a logic 1 source bus request signal 104 on the input line 110 corresponding to the source address 118 in the source address register 118 controlling the particular source multiplexer 124. Otherwise there is a logic 0 on output line 128. Accordingly, a logic 1 for pair signal 86 indicates the readiness for a data transfer 57 of both the respective source and destination buffers 36 and 32 of the respective source and destination devices 14 having respective source and destination device addresses 118 and 120 in respective associated source and destination address registers 114 and 116.

Preferably microcomputer 16 programs matching units 112 of matching logic 80 such that a device 14 is only paired with a single device 14 as a source, and with a single device 14 as a destination. That is, if a particular device 14 is addressed as the destination address 120 in the destination address register 116 of a particular matching unit 112, then no other matching unit 112 should address that particular device 14 as its destination address 120. Similarly, if a particular device 14 is addressed as the source address 118 in the source address register 114 of a particular matching unit 112, then no other matching unit 112 should address that particular device 14 as its source address 118. This limitation is required because a particular bus request signal 90 can only signal that a source buffer 36 and/or a destination buffer 32 of a particular device 14 are ready for a data transfer 57, and cannot signal which particular data transfer 57 is requested, should more than one possible data transfer 57 be programmed in matching logic 80.

Should it be desired that a particular device 14, such as device 14-1, transfer data signals 25 to device 14-2, and then later transfer data signals 25 to device 14-3, the proper procedure is for microcomputer 16 to first program a matching unit 112 the addresses 120 and 118 for the first data transfer 57. After the first data transfer 57 has occurred, microcomputer 16 can reprogram the matching unit with the addresses 120 and 118 for the second data transfer 57.

While the invention has been described with reference to the structures disclosed, it is not confined to the specific details set forth, but is intended to cover such modifications or changes as may come within the scope of the following claims.

We claim:

1. A method for determining readiness of devices in a digital data bus system to transfer data signals, the bus system including a bus having a clock line for communicating a clock signal, address lines for communicating address signals, data lines for communicating data signals, and control lines for communicating control signals, a plurality of devices, each device connected to the bus and having an address on the bus, at least one device being a source device capable of sending data signals and at least one device being a destination device capable of receiving data signals, and a bus controller connected to the bus for controlling the bus, the control lines including bus request lines connecting each device to the bus controller for communicating a bus request signal from a device to the bus controller, the bus request signal for indicating that the device is ready to send or receive data signals, the method comprising the steps of:
the bus controller storing into matching logic the identities of possible source and destination devices,
generating a list of device pairs and the direction of data flow between which the transfer of data signals will be allowed,
generating, by a source device, a bus request signal on the bus request lines indicating whether the source device is ready to send data signals on the data lines;
generating, by a destination device, a bus request signal on the bus request lines indicating whether the destination device is ready to receive data signals on the data lines; and
receiving, by the matching logic, the bus request signal generated by the source device and the bus request signal generated by the destination device and, provided the pair of destination and source device are a pair allowed to transfer data signals, deciding based on the received bus request signals whether the pair of the destination and source devices is ready to send and receive data signals.

* * * * *